UNITED STATES PATENT OFFICE.

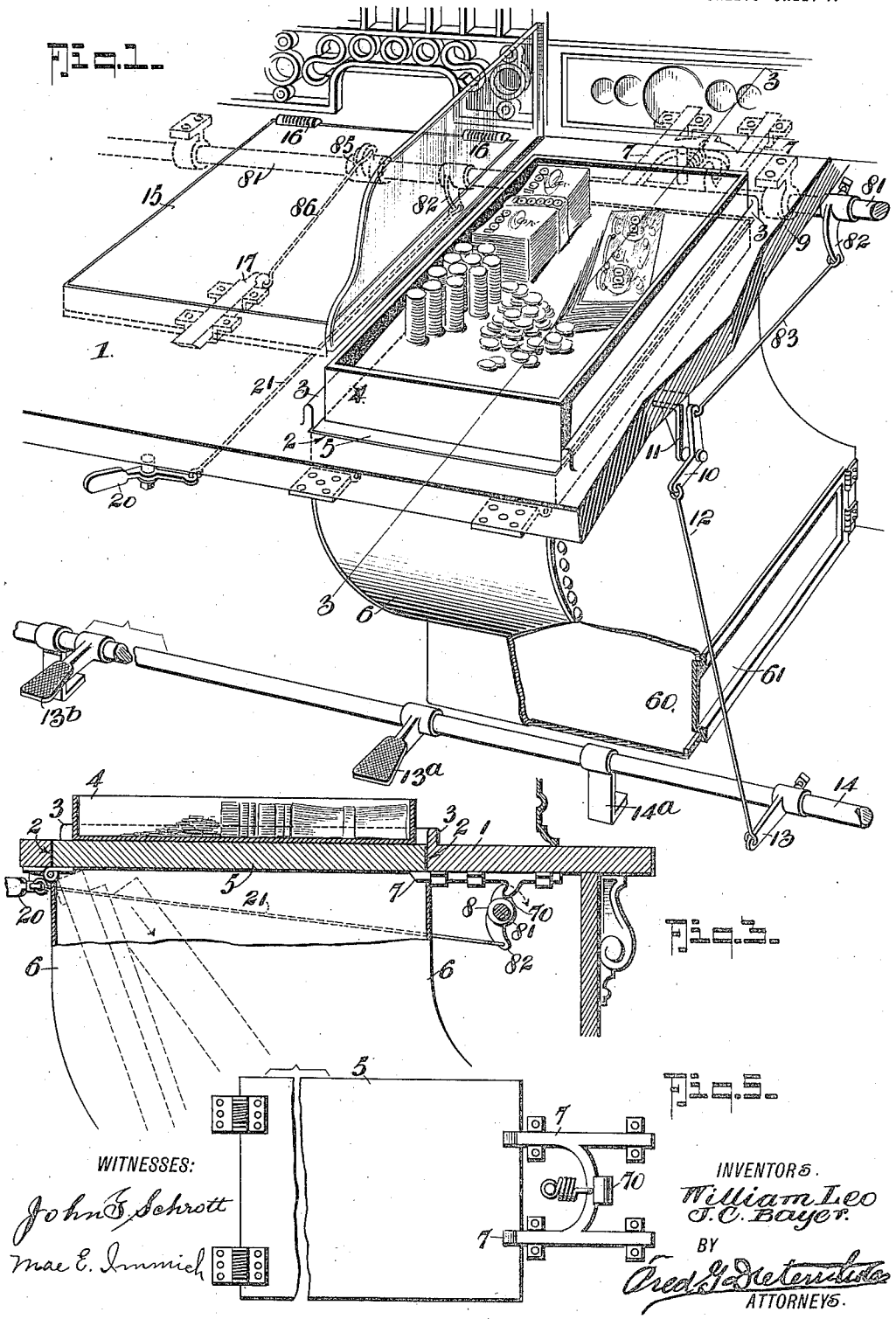

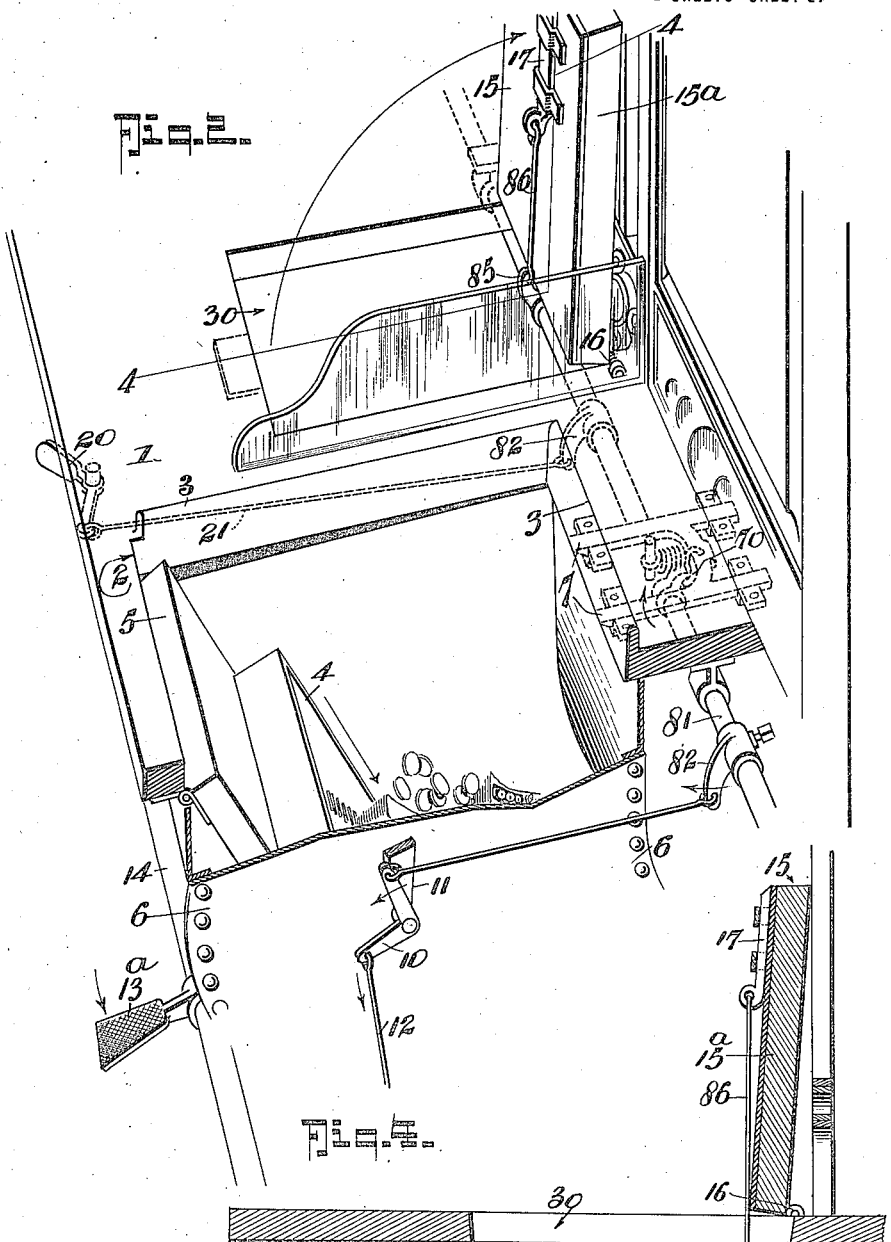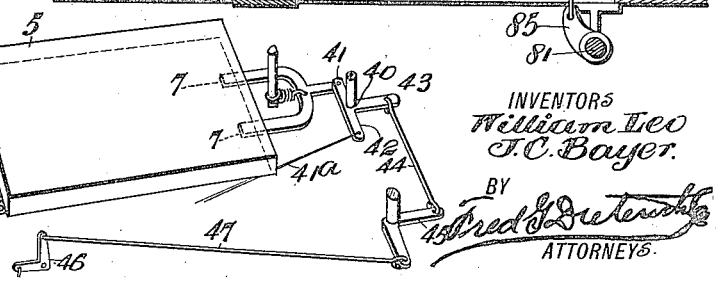

WILLIAM LEO AND JOSEPH C. BAYER, OF PORTLAND, OREGON.

BANK FURNITURE.

1,176,764.  Specification of Letters Patent.  Patented Mar. 28, 1916.

Application filed September 21, 1914. Serial No. 862,749.

*To all whom it may concern:*

Be it known that we, WILLIAM LEO and JOSEPH C. BAYER, residing at Portland, in the county of Multnomah and State of Oregon, have invented certain new and useful Improvements in Bank Furniture, of which the following is a specification.

This invention, which in its general nature has reference to improvements in bank furniture, is more particularly designed for the prevention of robbery of money or other valuables exposed upon a bank counter, desk, show window or other places, and it primarily has for its purpose to provide an improved means that has such relation to the counter or other place upon which it is customary to expose money, or other valuables, that is under the control of the bank cashier or salesman, and is adapted for being quickly and conveniently manipulated by the cashier or salesman for the instant disposal of money or other valuables to a place of safety, in case of robbers attempting to hold-up the cashier or salesman.

Our invention also has for its purpose to provide a means for the prevention of robbery of the character described, in which is included a receiver for the money or other valuables exposed upon the counter or desk, combined with an improved construction of trap door that forms that part of the counter or desk upon which the valuables are exposed, and an improved arrangement of locking devices for holding the trap door to the normal position and dropping means operable by the cashier, salesman, or other person within the bank or store, for releasing the said locking devices for dropping the counter or desk trap door.

With further objects in view that will hereinafter more fully appear, our invention embodies the peculiar construction and novel arrangement of parts hereinafter explained, specifically pointed out in the appended claims, and illustrated in the accompanying drawing, in which:—

Figure 1 is a perspective view of so much of a bank furniture as is necessary to illustrate an operative application of our invention, the counter "trap" member and the shield member being shown at their normal position. Fig. 2 is a similar view, the trap member being shown at the released position for safely dropping the articles into a receiver and the shield swung up for protecting the cashier or salesman. Fig. 3 is a cross section of the counter taken on the line 3—3 of Fig. 1. Fig. 4 is a similar view taken on the line 4—4 of Fig. 2. Fig. 5 is an inverted plan view of the trap member it being at the closed position and the preferred arrangement of the dropping mechanism for releasing said trap member being shown. Fig. 6 is a diagrammatic perspective view, which illustrates a modified arrangement of the trip arrangement hereinafter specifically described.

In the practical application of our invention, the bank counter 1 is provided with an elongated opening 2 of suitable size surrounded at the rear end and at the sides by a rim 3 which may be of wood or metal, and which serves as a guide for properly positioning the money holding tray 4, which is of a width to snugly slide between the guide rim 3, but is of a less length than the opening 2, the reason for which will presently appear.

5 designates what we term the "trap door," and the same consists of a body portion of a size to loosely fit within the opening 2 and the said door is hinged to the outer end to the outer edge of the opening so that its inner end, when released, drops down together with the tray 4, through the opening 2, to discharge the contents of the said tray into a receiver, which, when arranged for a bank counter, is in the nature of a bent chute 6 the lower end of which terminates in a collecting chamber 60 provided with a door 61, as shown.

The trap door 5 is normally held swung up flush with the counter by spring latches 7—7, which may be arranged as shown in Figs. 1 to 5, by reason of which it will be noticed that the said latches are located under the counter 1 at the inner or drop end of the door and to normally project under the front edge of the door and each of the said latches has a pendent lug 70 for coöperating with the hook-like ends of tripping levers 8, one for each latch 7, that are fixedly connected to a rock shaft 81, that joins with all of the levers 8 and which is mounted in brackets 9 pendent from the counter 1, as shown.

The levers 8 include pendent or crank arms 82 and to one of the said crank arms is connected a rod or cable 83 that extends to the inner edge of the counter 1 and joins with a bell crank lever 10 journaled in brackets 11 pendent from the counter, the other arm of which, through the cable 12, joins with a foot lever 13 that is fixedly connected to a rock shaft 14 journaled in brackets 14ª on the floor, and which is operable by a foot lever 13ª.

By referring more particularly to Fig. 1, it will be noticed that when our invention is used in a bank or like institution, the opening 2 is located adjacent the window through which money is usually received so that the tray 4 may be readly accessible and that the space in front of the window may be used for locating a shield or guard plate 15, the purpose of which is to protect the cashier against being shot, the said guard, in practice, being of sufficient thickness to prevent a bullet passing from the front grating edge of the counter to the cashier when the said guard is at the vertical position shown in Fig. 4.

To provide for readily swinging up the shield 15 at the same time the trap door is dropped, the said shield, which consists of a body portion 15ª of wood and a thick metal facing plate, is also in the nature of a swinging door which, when down fits in the opening 30 in the counter adjacent the outer or cage edge thereof. The guard or shield door is connected to spring hinges 16 that tend to normally swing the said door to the vertical position and it is held down by a spring latch 17 secured to the inner edge thereof for extending under the counter, see Fig. 1, which also shows that the rock shaft 81 carries a crank 85 to which is connected one end of a cable 86 whose other end joins with the latch 17.

By reason of the peculiar construction and novel arrangement of the parts so far as described, in case of an attempted hold-up, the cashier, by pressing the foot lever on the floor, rocks the shaft 81 and in consequence releases the several latches that hold up the trap door and the bullet shield down, and simultaneously drops the said trap door with the tray and its contents into the chute and frees the shield which instantly swings up to the vertical position to form a guard for the cashier.

While we have stated that the trap door and latch are released by a foot lever operated by the cashier, it should be also stated that supplemental means for rocking the latch releasing shaft 81 are also employed, which may be a hand trip lever 20, located at the inner edge of the counter, so that the cashier may conveniently actuate the lever shaft 81 by hand, the said hand lever 20 being connected to one of the crank members 82 on the said shaft 81 by the cable 21, and further to provide for releasing the door and the shield by some one within the bank or store, other than the one at the window the rock shaft 14 may be extended to a suitable point within the room, as indicated in the drawing and provided with another treadle 13ᵇ so that the trap and shield may be operated independently of the person at the window.

The system of lever devices for releasing the rod as shown may be readily modified to suit the particular condition of the desk, show window or counter, on which the valuable articles are to be displayed. For example, the latches 7 may be released by connecting them to one arm 41 of a double bell crank lever 40, the other arm 42 of which is connected by a cable 41 that extends to a suitable point within the room to be pulled when necessary, and the third arm 43 of the said lever 40 is connected by a cable 44 to a second bell crank lever 45 which joins with a hand operated lever on the inner edge of the counter, as shown in Fig. 6. 46 designates another bell crank lever connected to the bell crank 45 by the cable connection 47; the bell crank lever 46 is connected to the foot lever rod 14 in a suitable manner.

By providing a guide rim for the trap opening, arranged as shown, the goods holding tray cannot be placed over the edge of the counter or in any manner that would prevent the tray from being thrown into the chute as the trap door is lowered therein.

When our invention is used for banks and like institutions, the chute or receiver is curved to one side, since by making it of such shape renders it difficult to remove the contents thereof from above, but when it is desired to extend the chute through the floor the same may be straight.

From the foregoing description taken in connection with the drawing, the complete construction, the manner in which our invention is used and its advantages will be readily apparent to those skilled in the art to which it relates. The same may be economically and readily applied for use in connection with any counter or other shelf on which valuable articles are to be displayed for show or for sale.

What we claim is:

1. A counter having an opening, a trap door mounted in the said opening, a receiver below the opening, and a guard shield normally held in a plane with the closed trap door, and means for simultaneously releasing the door and the guard shield to drop the door with the articles resting thereon through the opening and permit the shield to swing up to the vertical position, said shield being located between the door and the outer edge of the counter.

2. A counter having an opening, a vertical guide located at the outer edge and the sides of the said opening flush with the said edge and the sides, a trap door mounted in the opening and hinged to swing down through said opening, a goods holding tray slidable between the aforesaid guides to rest upon the trap door and means for releasing the said door to drop it with the tray through the opening and a receiver under the said door.

3. As an improvement in bank furniture, a counter having two openings, one in advance of the other, a trap door hinged to swing down through the innermost of the said openings, a goods holding tray removably held upon the said door, means upon the counter for holding the said tray in proper position upon the door to drop with it through the said opening, a second door hingedly mounted in the other opening, means tending to normally swing the said second door to the vertical position, other means for holding the trap door and the tray to the swung-up position and the other door swung down in a plane with the counter, and further means operable from the rear of the counter for simultaneously releasing both doors.

4. A counter having an opening, a trap door mounted in the said opening, a receiver below the opening, and a guard shield, and means for simultaneously opening said trap door and raising said shield.

5. In bank furniture, a counter, a trap door in the counter on which a tray is located, a receiving vault beneath said counter, a latch for holding said trap door in position, and a mechanism for releasing said latch to drop said trap door.

6. In bank furniture, a counter, a trap door on which a tray is mounted, a receiving vault beneath said counter, a latch for holding said trap door in position, a mechanism for releasing said latch to drop said trap door, in combination with the cage, a shield adapted to be raised in front of the cage, and coöperative mechanism between said shield and said latch releasing mechanism for elevating said shield upon releasing said trap door.

7. As an improvement in bank furniture, a counter having two openings, one in advance of the other, a trap door hinged to swing down through the innermost of the said openings, a goods holding tray removably held upon said trap door, means for positioning the tray on the door to cause it to drop through the opening with the door, a second door hingedly mounted in the other opening, means tending to normally swing the said second door to the vertical position, other means for holding the trap door and the tray in the swung-up position and the other door swung down in a plane with the counter, the said means comprising a spring latch secured to the counter to project under the trap door, another spring latch on the second door that projects under the counter, means for simultaneously moving the said latches to release their respective doors, the said means including a rock shaft having crank members that coöperate with the latches for the trap door, and connections that join the said crank members with the latches on the second or shield door and manually operated means for actuating the rock shaft to release the latches.

8. In bank furniture, a counter having an opening, a trap door mounted in the said opening, a receiver below the opening and including a chute, said counter having a flange around said opening to receive a money tray, a money tray set on said trap door, and an operator manipulated device including a releasable latch for dropping said trap door to deposit said tray into said chute.

9. As an improvement in bank furniture, a counter having an opening, a trap door hinged to swing down through said opening, a tray removably held upon said trap door, means on the counter for positioning the tray on the door to cause it to drop through the opening with the door, a latch to hold said door in the plane of the counter, a rock shaft, a latch engaging finger on said rock shaft, an operator manipulated member and rod connections between said operator manipulated member and said rock shaft whereby the operator may release said latch to drop said door, a receptacle beneath the counter and a chute for depositing the dropped tray into said receptacle.

WILLIAM LEO.
JOSEPH C. BAYER.

Witnesses:
 A. T. Lewis,
 Arthur H. Lewis